Jan. 23, 1934. L. C. SCHILLO Re. 19,059

ONE-PIECE CUTTER

Original Filed Nov. 20, 1929 2 Sheets-Sheet 1

Inventor:
Louis C. Schillo,
By Frank L. Belknap
Atty.

Jan. 23, 1934. L. C. SCHILLO Re. 19,059

ONE-PIECE CUTTER

Original Filed Nov. 20, 1929 2 Sheets-Sheet 2

Inventor:
Louis C. Schillo,
By Frank L. Bilkemp
Atty.

Reissued Jan. 23, 1934 Re. 19,059

UNITED STATES PATENT OFFICE 19,059

ONE-PIECE CUTTER

Louis C. Schillo, Chicago, Ill., assignor, by mesne assignments, to Asphalt Process Corporation, New York, N. Y., a corporation of New Jersey Original No. 1,856,433, dated May 3, 1932, Serial No. 408,460, November 20, 1929. Application for reissue July 25, 1933. Serial No. 682,099

17 Claims. (Cl. 164—68)

This invention relates to improvements in a knife for cutting flexible roofing or shingle strips, slabs and the like, and refers more particularly to a knife of one-piece construction adapted to cut roofing elements from a sheet of flexible fibrous roofing material in such a manner that a more desirably cut shingle is produced than shingles cut by a multi-piece knife.

In the cutting of strip shingles the material to be cut usually comes in a roll of, say thirty-six inches in width. The roll is rotatably mounted upon bearings or mandrels, and the material, as unrolled, is passed to a cutter roll which comprises a plurality of coaxially mounted filler plates upon the peripheral surface of each of which is disposed a pair of three-piece cutting blades. To cut, for example, a four-tab shingle strip, five filler plates may be provided, the three intermediate plates supporting U-shaped blades adapted to cut equally spaced U-shaped slits in the roofing material. The two end filler plates support end cutters which are adapted to cut half U slits at each end of the material. The sheet material thus slitted is passed to a transverse cutter which severs the sheet transversely across the top of each of the U-shaped slits. Thus, a shingle unit is formed having a series of apertures which divide the lower edge of the unit into four tabs, resembling shingles.

The mounting of these aforementioned cutter or U slitter blades has been a source of much trouble to the industry, and it is to this feature that my invention is particularly directed.

The U-shaped cutter blades have heretofore been constructed in three pieces, the two longitudinal portions of the U, and the lower cross piece. It is obvious that this construction necessitated the separate mounting of each of the elements constituting the compound cutter blade. To do this properly is a difficult task involving much time and labor, and in addition, it has been found that at the point of juncture of the two longitudinal blades and the cross blade the slit would not always be cut cleanly. This disadvantageous feature resulted in a single strip which was imperfectly cut and necessitated additional handling of the strip to completely separate the waste portions defined by the U blades, and in addition, a strip is formed which, due to the imperfect cutting, is materially weakened at the corners of the cutout space between the tabs thereby making the strip susceptible to tearing.

One of the important objects of my invention resides in the provision of a one-piece blade which can be quickly and easily mounted upon a cutter roll, all adjustments and alignments being made in a fraction of the time necessary for the adjustment of the old three-piece blade. In addition, a clean cut is made which results in a shingle strip of much greater strength.

Another important feature of the present invention consists in the provision of a novel filler plate of such construction that a firmer foundation for the cutter blade is provided.

An additional feature of my invention resides in the disposition of the end cutters. The cutting edges of the three intermediate full U cutters are beveled inwardly toward the axis of the U. I have found that if the end half U cutters are beveled in the same manner the end material is forced inwardly toward the center of the strip and a perfectly cut half U incision cannot be made. To obviate this difficulty, the end cutters are beveled in the opposite direction to the central cutters, that is, the bevel slopes outwardly from the axis of the half U. By this arrangement the lateral force exerted by the beveled blades upon the roofing material acts outwardly from the center of the material and a more desirable end-cut is effected.

Other and further important objects of the invention will be apparent from the accompanying drawings and following detail description.

In the drawings, Fig. 1 is a side elevational view of a cutting blade in operative position.

Figure 1:
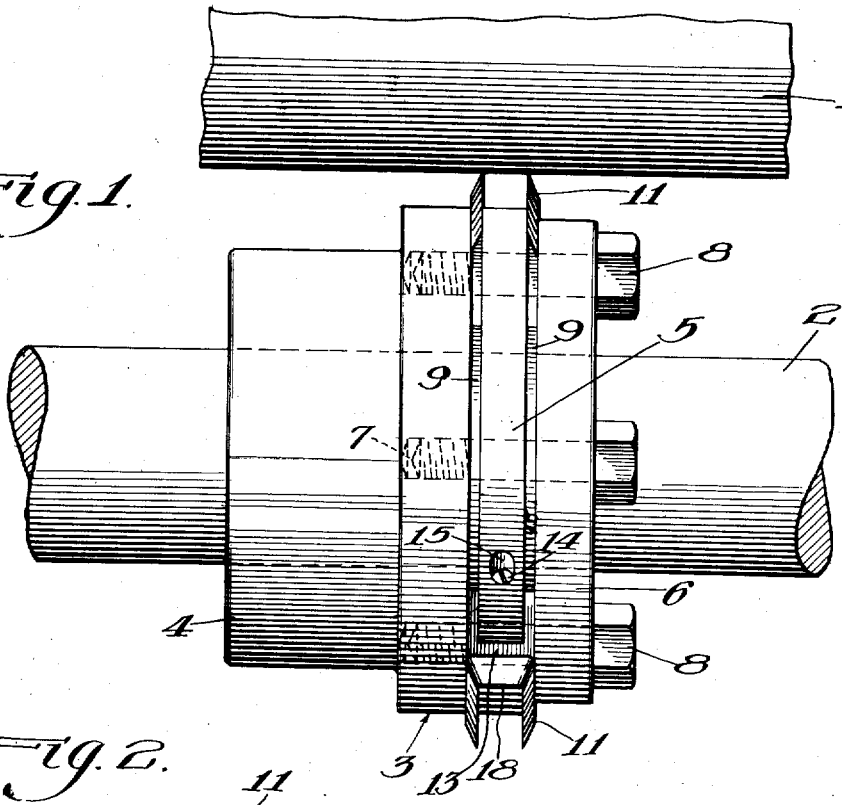
Figure 2:
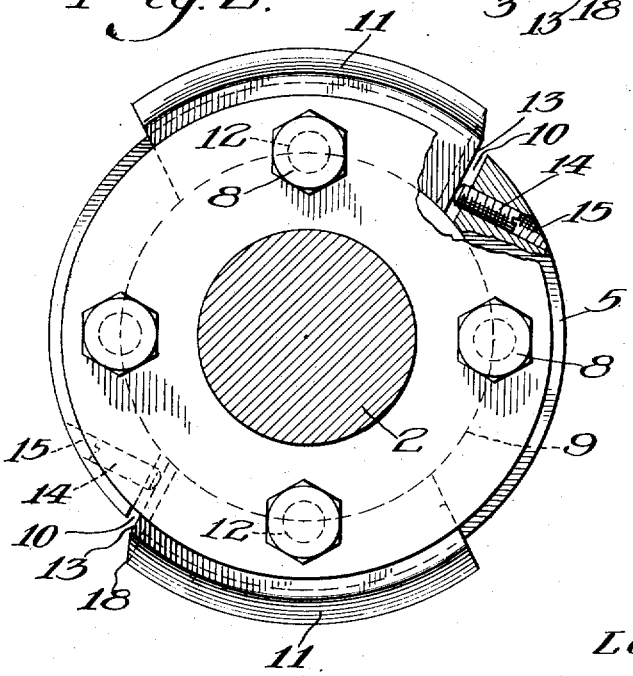
Fig. 2 is an end elevation of one of the cutting heads, parts being broken away.

Referring to the drawings in detail, 1 indicates a portion of a bed roll upon which the strip shingles are adapted to be cut. The roll 1 may be constructed of chilled steel, or if desired may comprise a cast iron core surrounded by a removable chilled steel sleeve or sleeves. In the latter case when the surfaces of the sleeves are worn the sleeves may be removed and replaced. The roll 1 may be rotatably mounted and may be provided with bearings (not shown) adjustably toward or away from a coacting cutting roll hereinafter more fully described.

The cutting roll or cutting units may be mounted upon a shaft 2 which may be rotatably mounted upon adjustable bearings (not shown). The cutting units may take the form of a composite cutting head 3, which may comprise a retaining collar 4, a filler plate 5 and a face plate 6. The entire assembled cutting unit 3 may be keyed or otherwise suitably mounted rigidly upon the shaft 2, being adapted to turn therewith. The retaining collar 4, filler plate 5 and face plate 6 may be provided with a plurality of registering apertures 7, to receive a plurality of screws or bolts 8. The apertures 7 in the retaining collar 4 may be internally threaded to engage with the threads of the screws 8. The screws 8 may be loosely positioned through the apertures provided in the filler plate 5 and face plate 6. Thus, it can be readily seen that upon tightening the screws 8 the collar 4, the filler plate 5 and the face plate 6 are drawn together into one unitary structure.

The filler plate 5 may comprise a disc-like element having integral offset shoulders 9 and provided with a transverse slot 10 in the peripheral edge of the plate 5.

A one-piece blade or knife 11 being arcuate in shape and provided with transverse apertures 12 is adapted to be mounted on filler plate 5, the lower arcuate edges of the knife being adapted to be supported by the shoulders 9, whereas the end 13 of the knife 11 may fit into the aperture 10. A set screw 14 may be disposed in an aperture 15 provided in the edge of the filler plate 5 adapted to lock the end 13 of the knife 11 in position upon the filler plate. It can be readily seen that, by tightening the set screws 14 and by drawing up the screws 8, the knives 11 may be securely retained upon the head 3.

Figure 4:
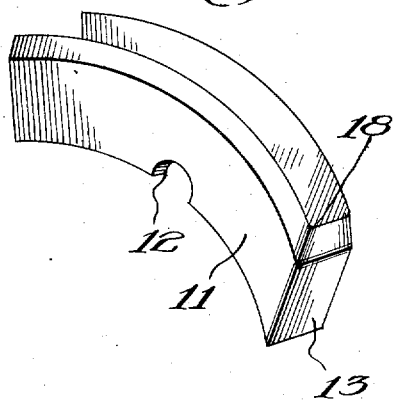
Fig. 4 is a detail perspective view, of one of the one-piece blades.
Figure 3:
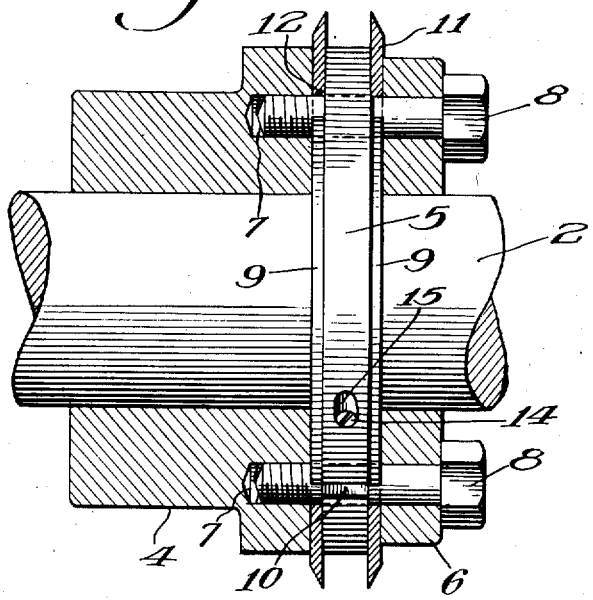
Fig. 3 is a sectional view, illustrating a cutting head supporting the one-piece blades in operative position.
Figure 6:
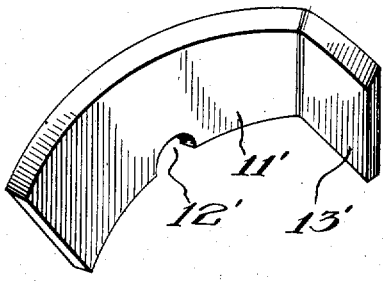
Fig. 6 is a detail perspective view of one of the end or side one-piece cutting blades.
Figure 5:
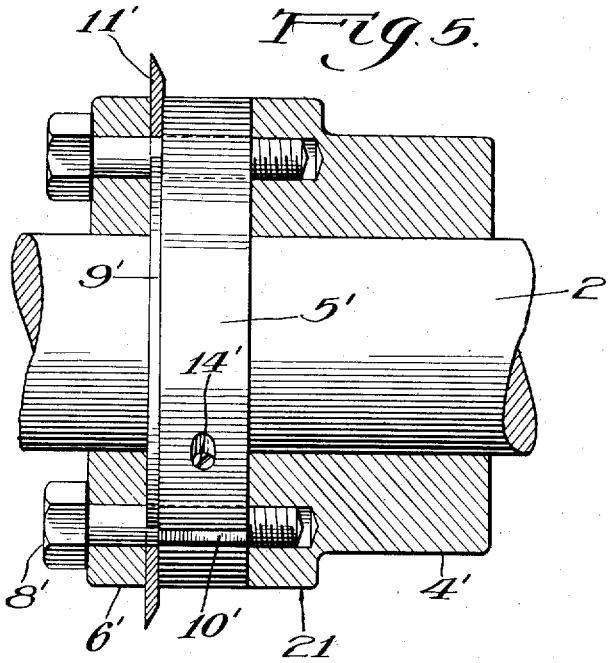
Fig. 5 is a sectional end elevation of an end or side cutting head, supporting an end or side one-piece cutting blade.
Figure 7:
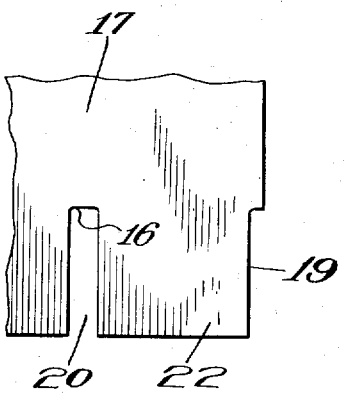
Fig. 7 is a fragmentary view of a portion of a strip shingle cut by means of my invention.

Obviously, by the use of the filler plate 5 and the one-piece knife 11, the mounting of the knife upon the head 3 is a relatively simple task and in addition the provision of the shoulders 9 provides an ideal firm foundation for the knives. Further, in the use of the one-piece knives 11, a fillet 16, shown in Fig. 7 may be provided in the finished strip shingle 17. This can be accomplished by rounding the cutting edges of the knife 11, as shown at 18 in Fig. 4. It can be readily seen that this feature is entirely absent in the use of multi-piece knives, with the result that the corners of the apertures cut thereby are imperfect and are susceptible to tearing.

In the construction of the usual shingle strips 17 end or side apertures 19 may be provided which may take the form of a half aperture 20. In this manner, when the strips are laid end to end, the two symmetrical end apertures 19 of the strip 17 provide a full aperture 20. Thus, a roof constructed with this type of shingle strip presents a pleasing uniform appearance.

In order to cut the end half apertures 19 a head may be provided, comprising a retaining collar 4′, a face plate 6′ and a filler plate 5′. The collar 4′ and face plate 6′ are substantially similar to the collar 4 and face plate 6, but the filler plate 5′ is provided with but a single shoulder 9′ instead of the double shoulder 9 as formed upon the filler plate 5. An arcuate L-shaped cutter blade 11′ is adapted to be mounted upon the filler plate 5′ in a manner to be hereinafter more fully described. A series of registering apertures may be provided in the collar 4′, face plate 6′ and filler plate 5′ into which screws 8′ are adapted to engage similar to the construction of the head 3. An aperture 12′ may be provided in the knife 11′ and, as is obvious, the blade 11′ may be securely clamped between the face plate 6′ and filler plate 5′ by means of the screws 8′. A transverse slot 10′ may be provided in the edge of the filler plate 5′ into which the end 13′ of the blade 11′ may be disposed, being retained therein by means of a set screw 14′. In this manner the blade 11′ may be readily and securely mounted upon the head 21.

In the formation of the usual strip shingle 17 having, for instance, four tabs 22, three fully equipped heads 3 may be mounted on shaft 2 in such a manner as to produce three equally spaced apertures 20. A cutting head may be mounted at each end of the shaft 2 and may form a half aperture 19 at each end of the strip 17. It is to be understood, of course, that a shingle strip of more or less than four tabs 22 may be provided as desired, merely by adding more or less heads 3.

I have found that, in cutting the end apertures, if the cutting edges of the end knives are beveled in one direction, for instance, if the beveled side of the knife is disposed toward the transverse center of the strip 17, a lateral thrust is produced upon the strip which tends to force the end of the strip toward the center and an imperfectly cut aperture 19 results.

Accordingly, one of the features of my invention resides in the disposition of the beveled edge of the knife 11′ on the outer side of the strip 17, that is, the flat edge of the blade 11′ faces the transverse center of the strip. When disposed in this manner the thrust exerted by the beveled edge acts outwardly from the transverse center of the strip and results in a perfectly cut end aperture.

Althought a U-shaped aperture is herein shown and described, it is to be understood that my invention contemplates the cutting of any shape aperture. I am also aware that many other modifications in form and structure may be devised without departing from the spirit of my invention, and hence I do not wish to be limited except as necessitated by the prior art.

It is apparent that I have provided a one-piece cutting blade and a means for mounting the same, which eliminates the tedious and time consuming operation of mounting and adjusting multi-piece blades used for the same purpose, and in addition, a better and more substantial product is produced. Further, the first cost and maintenance cost of a structure of this character is insignificant in comparison to the expensive cutters utilizing multi-piece blades.

I claim as my invention:

1. A cutting head including in combination, a filler plate, a substantially U shaped one-piece cutter blade removably mounted on the filler plate, means for uniting the filler plate and cutter blade in a unitary structure, said filler plate comprising an annular disk and an arcuate shoulder formed on a face of said disc, the edge of the disc being provided with a transverse slot for the reception of the bight of the cutter blade.

2. A cutting head including in combination, a filler plate, a one-piece cutter blade removably mounted on the filler plate, and means for uniting the filler plate and cutter blade in a unitary structure, said filler plate comprising an annular disc and an arcuate shoulder formed on each face of said disc, the edge of the disc being provided with a transverse slot for the reception of a portion of the cutter blade.

3. A cutting head including in combination, a filler plate, a substantially U shaped one-piece cutter blade removably mounted on the filler plate, and means for uniting the filler plate and cutter blade in a unitary structure, said filler plate comprising an annular disc and an arcuate shoulder formed on each face of said disc, the edge of the disc being provided with a plurality of transverse slots for the reception of the bights of the cutter blades.

4. In combination, an annular disc, an arcuate shoulder formed on each face of said disc, the periphery of said disc being provided with a transverse slot, a one-piece cutter blade having an angularly bent portion removably mounted on the disc, the base of the cutter blade being arcuate in shape and adapted to be positioned on said shoulders, the angularly bent portion of the cutter blade being positioned in said transverse slot.

5. In combination, a one-piece cutter blade, arcuate in shape in one plane and U-shaped in a plane at substantially right angles to the first plane, a filler plate comprising an annular disc provided with a slot in an edge thereof, an arcuate shoulder formed on a face of said disc, said one-piece cutter blade being adapted to be mounted on the filler plate, the cross portion of the U-shaped blade being disposed in said transverse slot and the arcuately shaped portion of the blade being adapted to register with and be positioned on the annular shoulder, and means for uniting the filler plate and cutter blade in a unitary structure.

6. Means for cutting an end or side slot in a moving sheet, comprising a cutting head mounted on a shaft, and an L shaped blade mounted on said head, the cutting edges of the blade being beveled outwardly toward the longitudinal edge of the moving sheet.

7. In a machine for cutting shingle strips, a shaft, a one-piece knife having blades for cutting the sides of a slot and a blade for cutting across the end of the slot, and means for supporting said knife upon said shaft comprising devices for engaging and clamping opposite sides of the first two blades, and devices for engaging the third blade.

8. In a machine for cutting shingle strips, a shaft, a one-piece knife having blades for cutting the sides of a slot and a blade for cutting across the end of the slot, a filler plate having a slot to receive the last blade, means mounted on said shaft for clamping the first two blades, and means for engaging the last blade to clamp the same in the slot.

9. In a machine for cutting shingle strips, a shaft, an arcuate one-piece knife having blades for cutting the sides of a slot and a blade for cutting across the end of the slot, a cutting head mounted on the shaft for holding the knife, shoulders on the cutting head for engaging with the inner edges of the first two blades to locate the knife radially with relation to said head, and means for clamping the knife to the cutting head.

10. In a machine for cutting shingle strips, a shaft, an arcuate one-piece knife having blades for cutting the sides of a slot and a blade for cutting across the end of the slot, a cutting head mounted on the shaft for supporting the knife comprising a spacing plate for engaging between the first two blades of the knife and having shoulders arranged to be engaged by the inner edges of said blades to locate the knife radially with relation to the cutting head, and means for clamping the knife.

11. A one-piece knife for a rotary device for cutting slots in roofing material in the formation of strip shingles, having a blade arcuate in the plane of the blade for cutting one side of a slot and a blade extending transversely of the first blade for cutting across the end of the slot, the angular space between the blades being unobstructed to receive a blade clamping means, said knife being formed to fit to the device with the arcuate blade extending circumferentially thereof.

12. A one-piece knife for a rotary device for cutting slots in roofing material in the formation of strip shingles, having blades for cutting the sides of a slot each arcuate in the plane of the blade, and a blade transverse to the first two blades and constituting the sole connection between the same for cutting across the end of a slot, at least said arcuate blades being formed to fit to a circumferentially extending surface of the device but not surrounding said device.

13. A one-piece knife for a rotary device for cutting slots in roofing material in the formation of strip shingles having blades for cutting the sides of a slot each arcuate in the plane of the blade, and means for connecting the corresponding ends of said blades, the blades having a unobstructed space between the same to receive a blade-clamping means and being formed to extend circumferentially of the device and to bear upon an extent of a circumferential surface of the device insufficient to hold the knife upon the device.

14. A one-piece removable knife for a rotary cutting device, said knife having a blade in the form of a strip having one edge thereof formed as a cutting edge and with the depth thereof from said cutting edge to the opposite edge of the strip in a plane transverse to the axis of rotation and formed with said cutting edge extending circumferentially of the rotation of the device and having a blade transverse to said first blade but integral therewith formed with a cutting edge extending generally axially of the device, said opposite edge of the strip being formed to bear upon a circumferentially extending surface of the device to an extent less than that required to envelope the device sufficiently to hold the blade upon the device and to prevent removal of the knife substantially in the plane of the blade.

15. A one-piece removable knife for a rotary cutting device, said knife having a blade in a plane transverse to the axis of rotation formed with a cutting edge extending circumferentially of the rotation of the device and having a blade transverse to said first blade but integral therewith formed with a cutting edge extending generally axially of the device, at least said first blade having an edge surface thereof opposite to the cutting edge formed to bear upon an exterior surface of the device, said knife being of a form removable substantially in the planes of the blades.

16. A one piece removable knife for a rotary cutting device, said knife having a blade in a plane transverse to the axis of rotation and formed with a cutting edge extending circumferentially of the rotation of the device and having a blade transverse to said first blade but integral therewith formed with a cutting edge extending generally axially of the device, said first blade having an edge surface thereof opposite to the cutting edge formed to bear upon a circumferentially extending exterior surface of the device to an extent less than that required to envelope the device sufficiently to hold the blade upon the device and to prevent removal of the knife substantially in the plane of the blade, said axially extending blade being formed with a surface generally radial with respect to said axis.

17. In a rotating cutting device, a one-piece knife having a blade formed with opposite faces extending generally transverse to the axis of rotation and having a blade integral with said first blade formed with a face extending generally in the direction of said axis, the cutting edges of said blades meeting at the line of joinder of the blades, and means for carrying said knife arranged to rotate upon said axis, said means including means bearing upon the faces of said first blade to clamp the knife in position and having a surface against which the face of the axially extending blade may bear when the knife is in position.

LOUIS C. SCHILLO.